(12) United States Patent
Vehkaperä

(10) Patent No.: US 10,447,907 B2
(45) Date of Patent: Oct. 15, 2019

(54) IMAGING APPARATUS WITH MOVING IMAGE SENSOR

(71) Applicant: Microsoft Technology Licensing, LLC, Redmond, WA (US)

(72) Inventor: Ville Vehkaperä, Oulu (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/252,177

(22) Filed: Aug. 30, 2016

(65) Prior Publication Data
US 2018/0063395 A1    Mar. 1, 2018

(51) Int. Cl.
*H04N 5/225*    (2006.01)

(52) U.S. Cl.
CPC ......... *H04N 5/2257* (2013.01); *H04N 5/2252* (2013.01); *H04N 5/2253* (2013.01); *H04N 5/2254* (2013.01)

(58) Field of Classification Search
CPC .. H04N 5/2257; H04N 5/2252; H04N 5/2253; H04N 5/2254
See application file for complete search history.

(56) References Cited

U.S. PATENT DOCUMENTS

| 7,657,173 | B2 | 2/2010 | Lee et al. |
| 7,764,320 | B1 * | 7/2010 | Salvato .............. G06K 7/10881 348/344 |
| 8,041,201 | B2 | 10/2011 | Eromaki et al. |
| 8,098,319 | B2 | 1/2012 | Demuynck |
| 8,274,599 | B2 | 9/2012 | Gustavsson et al. |
| 8,605,211 | B2 | 12/2013 | Webster et al. |
| 8,814,447 | B1 * | 8/2014 | Hambergen .......... G03B 17/04 396/348 |
| 9,143,749 | B2 | 9/2015 | Wernersson |
| 9,225,885 | B2 | 12/2015 | O'Brien |
| 9,241,097 | B1 | 1/2016 | Tam |
| 9,244,253 | B2 | 1/2016 | Chen et al. |
| 9,285,654 | B2 | 3/2016 | Lipson et al. |
| 9,316,810 | B2 | 4/2016 | Mercado |
| 2006/0115260 | A1 | 6/2006 | Nomura |

(Continued)

OTHER PUBLICATIONS

Khan, Farrha, "Paper-thin lenses could eliminate the smartphone camera bump", Published on: Feb. 13, 2016, 9 pages, Available at: http://www.in.techradar.com/news/photography-video-capture/Paper-thin-lenses-could-eliminate-the-smartphone-camera-bump/articleshow/50968569.cms.

(Continued)

*Primary Examiner* — Mekonnen D Dagnew

(57) ABSTRACT

The imaging device comprises a movable image sensor; a circuit board connected to the image sensor; an optical module comprising a lens group on an optical axis, the optical module being movable along the optical axis between at least a retracted position and an extended position. The device also includes an activating actuator configured to move the movable image sensor and the circuit board in a plane between an active position and an inactive position. In the active position the image sensor is stacked under the optical module on the optical axis, and the optical module is in an extended position. In the inactive position the image sensor is positioned off the optical axis and away from the optical module, and the optical module is in a retracted position.

20 Claims, 4 Drawing Sheets

(56) References Cited

U.S. PATENT DOCUMENTS

| | | | |
|---|---|---|---|
| 2007/0091476 A1* | 4/2007 | Takashima | G02B 7/102 |
| | | | 359/822 |
| 2012/0218449 A1 | 8/2012 | Pavithran et al. | |
| 2013/0088631 A1 | 4/2013 | Hwang et al. | |
| 2013/0182174 A1 | 7/2013 | Hatakeyama et al. | |
| 2014/0086569 A1* | 3/2014 | Nomura | G02B 27/646 |
| | | | 396/55 |
| 2016/0044232 A1 | 2/2016 | Kim et al. | |

OTHER PUBLICATIONS

Lovejoy, Ben, "Apple patent shows how it might lose the camera bump despite ever-thinner iPhones", Published on: Jan. 26, 2016, 11 pages, Available at: http://9to5mac.com/2016/01/26/iphone-camera-bump-solution/.

Selleck, Evan, "Samsung Galaxy S7 leak shows off a rear camera with only a minor bump", Published on: Feb. 8, 2016, 7 pages, Available at: http://www.androidbeat.com/2016/02/samsung-galaxy-s7-leak-shows-off-a-rear-camera-with-only-a-minor-bump/.

"International Search Report and Written Opinion Issued in PCT Application No. PCT/US2017/048090", dated Jan. 18, 2018, 19 Pages.

\* cited by examiner

IMAGING APPARATUS WITH MOVING IMAGE SENSOR

BACKGROUND

Digital cameras usually comprise a lens and a sensor for capturing an image by capturing light and converting it into electrical signals. Mobile electronic devices such as smart phones are usually equipped with an imaging apparatus, a camera. The imaging quality of the mobile electronic devices may be improved by optical image stabilization or autofocus. A current trend in designing mobile electronic devices aims for thin devices, wherein the form factor benefits from thin imaging apparatus to be housed inside the mobile electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The imaging apparatus comprises a structure with active and inactive positions. An image sensor and an optical module are movable in this structure. To enter an active position, the optical module extends along an optical axis, and the image sensor moves horizontally under the extended optical module. To enter the inactive position, the image sensor moves away, freeing space for the optical module to return to.

Many of the attendant features will be more readily appreciated as they become better understood by reference to the following detailed description considered in connection with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompanying drawings, wherein:

FIG. 3d provides a different viewing angle for FIG. 3a;

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although some of the present embodiments are described and illustrated herein as being implemented in a mobile camera, this is provided as an example and not a limitation. As those skilled in the art will appreciate, the present embodiments are suitable for application in a variety of different types of cameras in mobile and/or hand-held apparatuses, e.g. in tablets, laptops, digital cameras or gaming consoles, as well as stationary terminals with cameras.

FIG. 1a is a simplified cross-sectional view of one example of an imaging device with moving elements. The imaging device comprises a movable image sensor 110 and a circuit board 111 connected to the image sensor 110. A digital image sensor generally requires a circuit board with electronics connected to it to be operational. The image sensor 110 hereinafter can refer to the actual sensor as well as its housing and possible electronic components.

The imaging device comprises an optical module 120, which includes a lens group through which the light travels to the image sensor 110. The optical module 120 has an optical axis 121, and is configured to move between a retracted position and an extended position, wherein both positions are assumed along the optical axis 121. The retracted position herein relates to a position wherein the optical module 120 is lowered into the device body. The extended position herein relates to a position wherein the optical module 120 is moved outward along the optical axis towards a captured object. The positions of the optical module 120 are retracted and extended relative to parts of the imaging device which are not moving. In some embodiments mentioned below, the optical module 120 may protrude from the imaging device in the extended position. FIG. 1a shows the retracted position, as discussed below in further detail.

The lens group may comprise only one lens or it may be a combination of several lenses. In an embodiment, the optical module 120 includes is a lens barrel, wherein the lenses may be fixed in relation to each other or they may be moved in order to enable various optical characteristics. The lens barrel may be extendible according to an embodiment, wherein relative movement of lenses in the extendible lens barrel causes the movement of the optical module 120. In an example embodiment, this movement is telescopic movement.

The optical module may also include an autofocus element and/or an image stabilization element. In an embodiment, an autofocus actuator is configured to alter the optical zoom factor. In an embodiment, the optical zoom factor is altered by an actuator configured inside the lens barrel.

Figure 1:
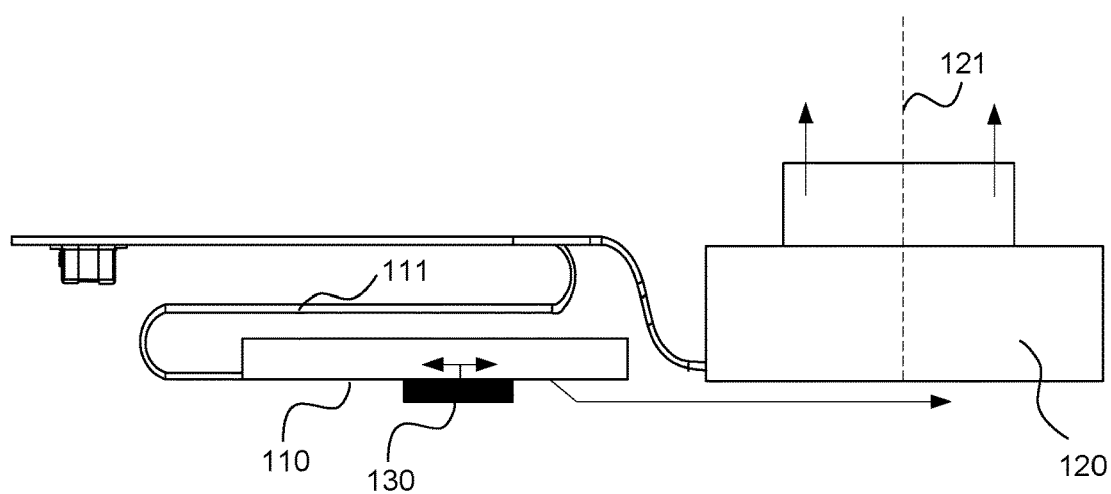
FIG. 1 is a schematic side view of one embodiment of an imaging device.

The imaging device further comprises an activating actuator 130 configured to move the movable image sensor 110 and the circuit board 111 in a plane between an active position and an inactive position. FIG. 1 shows an inactive position wherein the image sensor 110 is positioned off the optical axis of, and away from, the optical module 120, and the module 120 is in a retracted position. The horizontal arrows on FIG. 1 illustrate movement of the image sensor 110 caused by the activating actuator 130, i.e. the actuator 130 controls horizontal (planar) movement of the image sensor 110, and to assume an active position the image sensor 110 travels under the optical module 120 to form a stack. The vertical arrows show the direction of movement of the optical module 120 along the optical element in order to assume an extended active position. Both movements of the image sensor 110 and the optical module 120 between their positions are reversible. In an embodiment, the activating actuator 130 is configured to move the image sensor 110 and not the circuit board 111. In an alternative embodiment, the activating actuator 130 moves only parts of the circuit board 111 and the image sensor 110.

According to an embodiment, movement of the image sensor 110 and the circuit board 111 between the active and the inactive position may have a different trajectory than movement in an arc. For example, the image sensor may move in an arc or move both horizontally in a plane, and vertically to assume the active or inactive position.

The activating actuator 130 may be, but is not limited to, a motor, a piezo element, a rotational movement actuator, a voice coil actuator, a shape memory alloy actuator, a ferromagnetic actuator and others.

In the active position the image sensor 110 is stacked under the optical module 120 on the optical axis 121, and the optical module 120 is in an extended position. The active position may be activated, for example, when the imaging device is switched on, and the inactive position may be activated when the imaging device is switched off.

In an embodiment, the imaging device comprises a space for the movement of the optical module 120 and the movable image sensor 110 to allow for their movement between positions. At least part of this space is occupied alternately: either by the image sensor 110 in the active position, or by the retracted optical module 120 in the inactive position.

Figure 2A:
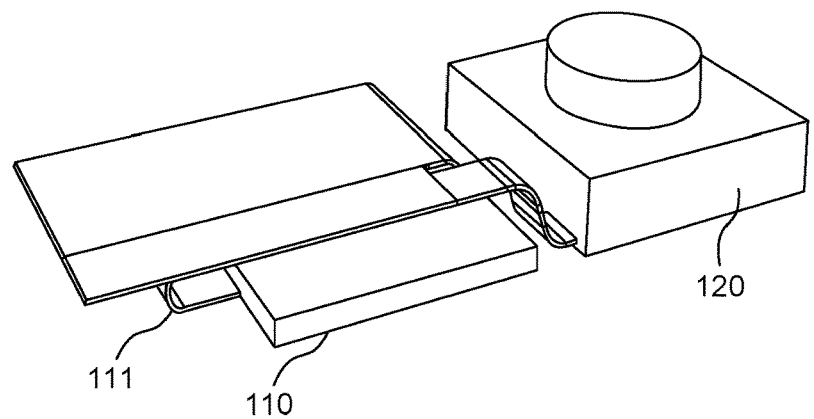
FIG. 2a is a schematic view of one embodiment with the image sensor and the optical module in an inactive position.
Figure 2B:
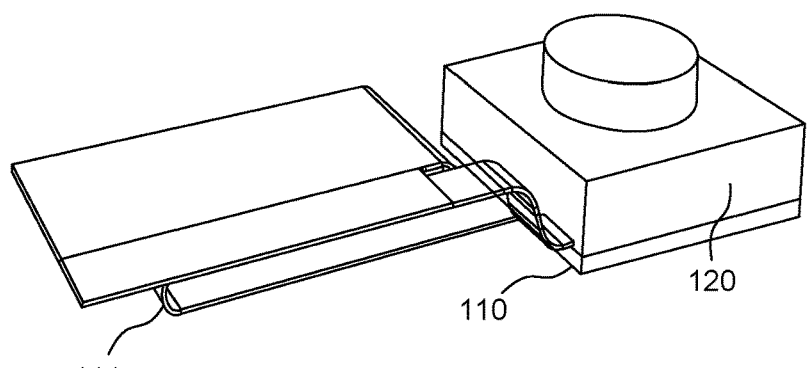
FIG. 2b is a schematic view of the embodiment in an active position.

FIGS. 2a and 2b show the inactive and active positions of the imaging device of FIG. 1, respectively. As discussed above, in the inactive position the image sensor 110 is positioned away from, and off the optical axis of, the optical module 120. In the active position, illustrated on FIG. 2b, the image sensor 110 is stacked under the extended optical module 120.

In an embodiment, the imaging device comprises a pressing mechanism configured to apply a pressing force continuously to the optical module 120 towards the retracted, or inactive, state. The pressing mechanism may be integrated in the device casing or be a separate module. The optical module 120 is configured to enter the extended state when a sufficient counteracting force is applied in the direction opposite to the pressing force. The sufficient counteracting force may be caused by the movement of the image sensor 110 and push the optical module "up", i.e. towards its extended position. The pressing mechanism ensures that, unless a counteracting force is applied, the imaging device is maintained in the inactive position, which helps avoid damage to the image sensor, dirt getting into the optical elements and other unwanted issues. In an embodiment, the image sensor 110 in the inactive position is positioned in a protected spot, preventing dust and other environmental hazards from damaging the image sensor 110.

In an embodiment, the imaging device comprises a movement limiting element configured to retain the optical module either in the extended or the retracted position. In an embodiment, movement of the optical module 120 is further assisted by a guide rail.

The imaging device may also comprise a window attached to the movable image sensor 110. The window serves to protect the image sensor 110 from dust and other environmental hazards.

According to an embodiment, the optical module 120 is configured to assume the extended and retracted positions due to a mechanical connection with the movable image sensor 110. For example, the mechanical connection may include direct physical contact by which the movable image sensor 110 is configured to push the optical element 120 to the extended position when the image sensor 110 moves to the active position horizontally, as caused by the activating actuator 130.

The mechanical connection may also be implemented via the activating actuator 130. The actuator 130 may be connected both to the image sensor 110 and the optical module 120, and in addition to moving the image sensor 110 may cause the movement of the optical module 120 between the extended and retracted positions.

As shown on FIGS. 3a-3d, the above movement can be implemented via a connecting arm 331 and a pin 332. The imaging device comprises a pin 332 attached to the optical module 120, wherein the activating actuator 130 comprises a connecting arm 331 configured to lift the optical module 120 into the extended position along the optical axis via the pin 332 attached to the optical module 120 when the activating actuator 130 moves the movable image sensor 110 in a plane towards the active position. FIGS. 3a-3d show an external part of the imaging device in an active (FIGS. 3a and 3d) and inactive (FIGS. 3b and 3c) state. In this embodiment, when the image sensor 110 is moved by the activating actuator 130 under the optical module 120, the movement causes the connecting arm 331 to move up towards the pin 332, make contact with the pin 332 and lift the optical module 120 towards its extended position.

Figure 3A:
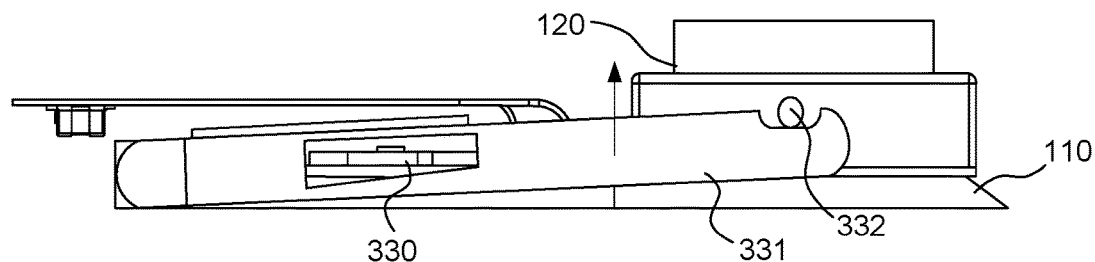
FIG. 3a is a schematic side view of a device with a mechanical connection according to an embodiment in an active position.
Figure 3B:
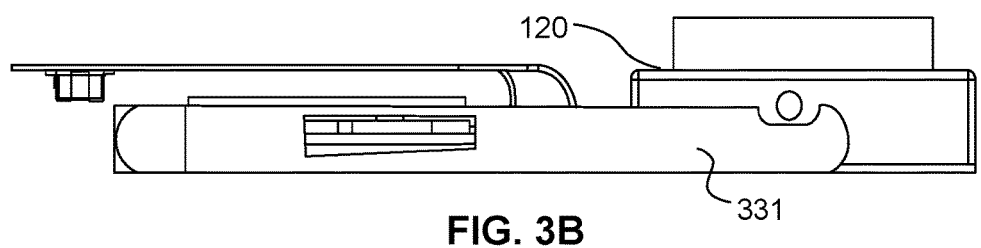
FIG. 3b is a schematic side view of the embodiment when the camera is inactive.
Figure 3D:
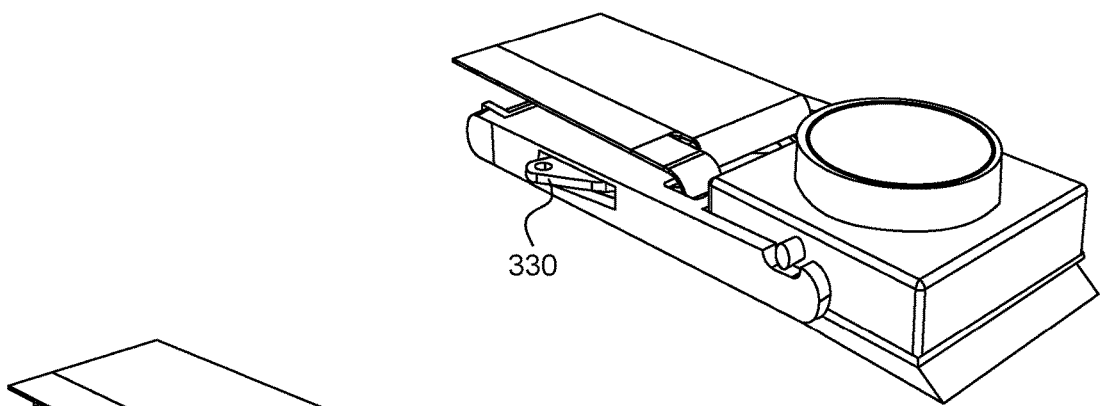
Figure 3C:
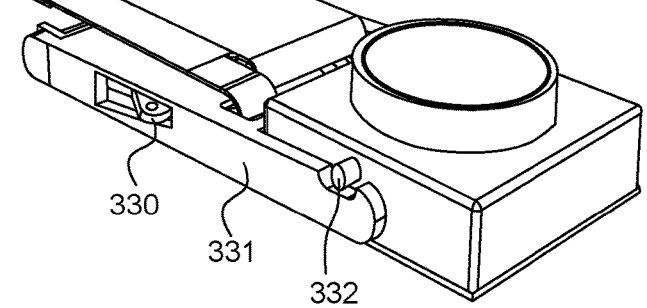
FIG. 3c provides a different viewing angle for FIG. 3b.

According to an embodiment, the imaging device comprises a mechanical lever 330, wherein the activating actuator 130 is configured to move the movable image sensor 110 and the circuit board 111 in a plane between an active position and an inactive position via the mechanical lever 330. This can be implemented, for example, by providing a mechanical connection between the lever 330 and the activating actuator 130. FIGS. 3c and 3d show a hole in the mechanical lever which can be used to hold a pin or another connecting element from the actuator 130.

The movement of the connecting arm 331 can be configured such that the optical module 120 is lifted prior to the movable image sensor 110 moving to the active position. This allows freeing a space under the lifted optical module 120 for the image sensor 110 to move into, thereby avoiding unwanted friction between the moving elements. The movable image 110 sensor may comprise a wedge-shaped edge, as can be seen on FIGS. 3a and 3d.

Figure 4A:
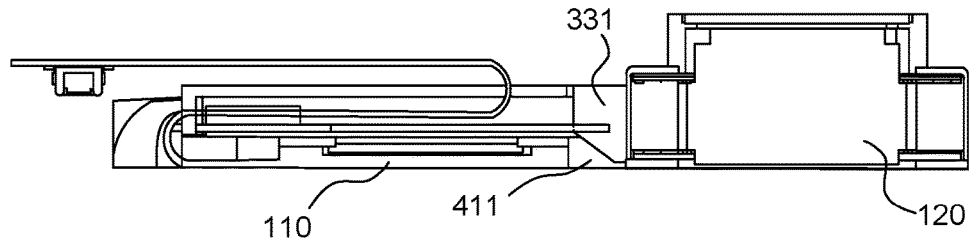
FIG. 4a is a cross-sectional view of an embodiment in an active position.
Figure 4B:
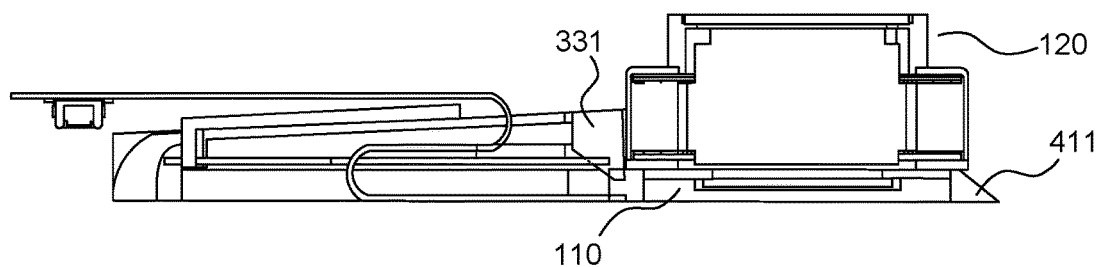
FIG. 4b is a cross-sectional view of the embodiment in an inactive position.

FIGS. 4a and 4b schematically illustrate the internal parts of the imaging device as shown in FIGS. 3a-3d. The wedged element 411 is shown to make contact with the internal part of the connecting arm 331, wherein the shapes of the internal part 331 is built to match the wedged element 411 of the image sensor 110. When the activating actuator 130 (not shown in these figures) starts moving the image sensor 110 towards the active position under the optical module 120, the wedged element 411 pushes the connecting arm 331 up, which engages the movement illustrated in FIGS. 3a-3d and lifts the optical module 120.

This movement provides a reliable mechanism for activating and deactivating the imaging apparatus using one activating actuator.

In an embodiment, the imaging device comprises a casing with an opening. The optical module 120 is configured to move through the opening to assume the extended position, and be concealed in the casing in the retracted position. In the active position, the optical module 120 may protrude from the casing along the optical axis 121. Alternatively, the optical module 120 may be positioned inside the casing in both positions. The opening in the casing is positioned to match the optical module 120 so that the light may travel through the opening into the optical module 120 and onto the image sensor 110.

In an embodiment, the optical module 120 comprises a top section with a first diameter and a lower section with a second diameter below the top section, wherein the first diameter is smaller than the second diameter. On the figures, a circular top section and a wider rectangular lower section illustrate this layout. As it is clear to a skilled person, this is not a limiting feature and other shapes and sizes are possible according to other embodiments. This allows pressing down the optical module 120 by applying a downward force to the wider lower section, without affecting or touching the lenses. In the embodiment wherein the device comprises a casing, the top element with smaller diameter may be configured to protrude from the casing in the active position.

Figure 5:
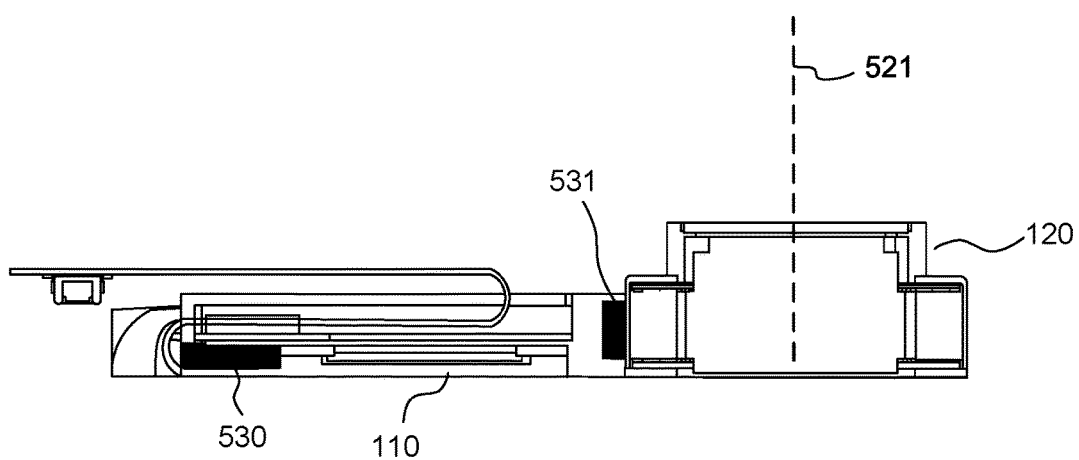
FIG. 5 is a cross-sectional view of one embodiment wherein the optical module and the image sensor have separate actuators.

FIG. 5 schematically illustrates an imaging device according to an embodiment. The imaging device comprises an additional actuator 531 attached to the optical module 120, wherein the additional actuator 531 is configured to move the optical module 120 along the optical axis 521. This provides a separate actuator 530, 531 for both moveable elements, the image sensor 110 and the optical module 120. An effect of this arrangement can be precise control of the movement, with little room for mechanical error.

In an embodiment, the device further comprises a movement controlling element configured to synchronize the activating actuator 530 and the additional actuator 531 such that the movement of the movable image sensor 110 in a plane into the active position is synchronized with the movement of the optical module 120 into an extended position. The movement controlling element may be implemented in the device's central processing unit, or be implemented as a separate controller. This allows for precise changes between active and inactive positions. The additional actuator may be, but is not limited to, a forklift-type actuator, a piezo element, a rotational movement actuator or a ferromagnetic actuator.

In an embodiment, the imaging device comprises an additional circuit board (not shown) attached separately to the optical module 120. This may provide additional options in the layout of the imaging device, as the circuit board 111 does not need to be connected also to the optical module. In an embodiment, the optical module 120 comprises only mechanical elements and does not require connection to a circuit board.

According to an embodiment, the circuit board 111 is flexible. A flexible circuit board 111 may comprise all electronics necessary for the image sensor, and may be connected to, and comprise the necessary electronics for, the optical module 120 as well. The flexible circuit board 111 can have an effect of dynamic flexing tolerance, which allows the element to withstand repeated movement. Flexibility can allow the circuit board 111 to repeatedly follow the planar movement of the image sensor 110.

In an alternative embodiment, the circuit board 111 comprises a flat cable harness such as a micro coaxial harness with cables attached on either side.

According to an example embodiment, the thickness of the optical module 120 is 3.4 millimeters along the optical axis, and the thickness of the movable image sensor 110 is 0.7 millimeters.

The technical effect of one or more of the above embodiments may be the reduction of camera thickness to 3.4 mm or less when the elements are retracted and in inactive position.

Figure 6:
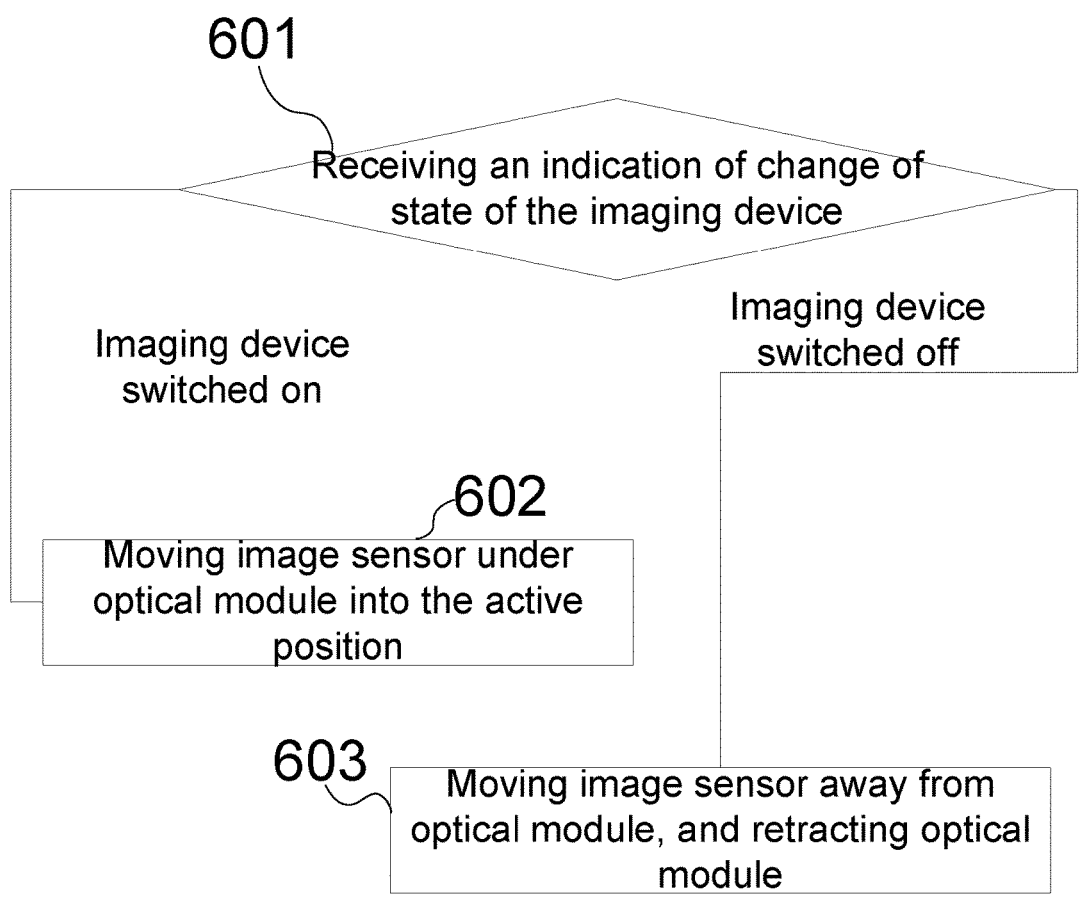
FIG. 6 shows a flow chart according to a method.

FIG. 6 is a flow chart showing a method for operating an imaging device. The method may be performed by a controller in the device, for example a central processing unit. The imaging device may be the device according to one or more of the above embodiments. The method includes receiving 601 an indication that the imaging device has changed state between an "on" and "off" state. When the imaging device is switched on, the activating actuator is caused 602 to move the movable image sensor into an active position, in which the image sensor is stacked under the optical module on the optical axis, and the optical module is in an extended position. When an indication that the imaging device has been switched off is received, the activating actuator is moved 603 into the inactive position, in which the image sensor is positioned off the optical axis and away from the optical module, and the optical module is in a retracted position.

In embodiments, the method may be carried out by an apparatus comprising a processing unit configured to receive the indications from the imaging device that it has been switched on or off, and to perform the steps 602 and 603. The apparatus may also comprise a detection element configured to detect user input or automatic decision indicating that the imaging device should be switched on or switched off.

According to an aspect, an imaging device is provided. The imaging device comprises: a movable image sensor; a circuit board connected to the image sensor; an optical module comprising a lens group on an optical axis, the optical module being movable along the optical axis between at least a retracted position and an extended position; and an activating actuator configured to move the movable image sensor and the circuit board in a plane between an active position and an inactive position. In the active position the image sensor is stacked under the optical module on the optical axis, and the optical module is in an extended position. In the inactive position the image sensor is positioned off the optical axis and away from the optical module, and the optical module is in a retracted position.

In an embodiment, in addition to the above the device comprises a space for the movement of the optical module and the movable image sensor, wherein at least part of the space is occupied alternately by the movable image sensor in the active position, and by the retracted optical module in the inactive position.

In an embodiment, alternatively or in addition to the above embodiments, the optical module is configured to assume the extended and retracted positions due to a mechanical connection with the movable image sensor.

In an embodiment, in addition to the above embodiment, the activating actuator is mechanically connected to the movable image sensor and the optical module, and wherein the activating actuator is configured to cause movement of the optical module between an extended position and a retracted position.

In an embodiment, in addition to the above embodiment, the device comprises a pin attached to the optical module, wherein the activating actuator comprises a connecting arm configured to lift the optical module into the extended position along the optical axis via the pin attached to the optical module when the activating actuator moves the movable image sensor in a plane towards the active position.

In an embodiment, in addition to the above embodiment, the device comprises a mechanical lever, wherein the activating actuator is configured to move the movable image sensor and the circuit board in a plane between an active position and an inactive position via the mechanical lever.

In an embodiment, alternatively or in addition to the above embodiments, the device comprises an additional actuator attached to the optical module, wherein the additional actuator is configured to move the optical module along the optical axis.

In an embodiment, in addition to the above embodiment, the device comprises a movement-controlling element configured to synchronize the activating actuator and the additional actuator such that the movement of the movable image sensor in a plane into the active position is synchronized with the movement of the optical module into an extended position.

In an embodiment, alternatively or in addition to the above embodiments, the circuit board is a flexible circuit board connected to the image sensor. In an embodiment, in addition to the above embodiment, the flexible circuit board is also connected to the optical module.

In an embodiment, alternatively or in addition to the above embodiments, the thickness of the optical module is 3.4 millimeters along the optical axis, and the thickness of the movable image sensor is 0.7 millimeters.

In an embodiment, alternatively or in addition to the above embodiments, the device comprises a pressing mechanism configured to apply a pressing force continuously to the optical module towards the retracted state, wherein the optical module is configured to enter the extended state when a sufficient counteracting force is applied in the direction opposite to the pressing force.

In an embodiment, alternatively or in addition to the above embodiments, the device comprises a movement limiting element configured to retain the optical module either in the extended or the retracted position.

In an embodiment, alternatively or in addition to the above embodiments, the device comprises a casing with an opening, wherein the optical module is configured to move through the opening to assume the extended position, and be concealed in the casing in the retracted position.

In an embodiment, alternatively or in addition to the above embodiments, the optical module comprises a top section with a first diameter and a lower section with a second diameter below the top section, wherein the first diameter is smaller than the second diameter.

In an embodiment, alternatively or in addition to the above embodiments, the device comprises a guide rail configured to guide the optical module between the extended position and the retracted position.

In an embodiment, alternatively or in addition to the above embodiments, the optical module comprises an extendible lens barrel.

In an embodiment, alternatively or in addition to the above embodiments, the optical module comprises at least one of an image stabilization element and an autofocus element.

In an embodiment, alternatively or in addition to the above embodiments, the device comprises a window attached to the movable image sensor.

According to an aspect, a method for operating an imaging device is provided. The imaging device comprises a movable image sensor configured to move in a plane, a circuit board connected to the image sensor, an optical module comprising a lens group on an optical axis movable along the optical axis between at least a retracted position and an extended position, and an activating actuator attached to the movable image sensor and the circuit board.

The method comprises receiving an indication that the imaging device has been switched on; causing the activating actuator to move the movable image sensor into an active position, in which the image sensor is stacked under the optical module on the optical axis, and the optical module is in an extended position; receiving an indication that the imaging device has been switched off; and causing the activating actuator to move into the inactive position, in which the image sensor is positioned off the optical axis and away from the optical module, and the optical module is in a retracted position.

According to an aspect, an apparatus for operating an imaging device is provided. The imaging device comprises a movable image sensor configured to move in a plane, a circuit board connected to the image sensor, an optical module comprising a lens group on an optical axis movable along the optical axis between at least a retracted position and an extended position, and an activating actuator attached to the movable image sensor and the circuit board.

The apparatus comprises means for receiving an indication that the imaging device has been switched on; means for causing the activating actuator to move the movable image sensor into an active position, in which the image sensor is stacked under the optical module on the optical axis, and the optical module is in an extended position; means for receiving an indication that the imaging device has been switched off; and means for causing the activating actuator to move into the inactive position, in which the image sensor is positioned off the optical axis and away from the optical module, and the optical module is in a retracted position. The means for performing the above steps may be implemented in a controller element such as a central processing unit.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments or a combination thereof. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to or combinations of the disclosed embodiments without departing from the spirit or scope of this specification.

The invention claimed is:

1. An imaging device, comprising:
a movable image sensor;
a circuit board connected to the movable image sensor;
an optical module comprising a lens group on an optical axis, the optical module being movable along the optical axis between at least a retracted position and an extended position; and
an activating actuator configured to move the movable image sensor and the circuit board in a movement plane between an active position and an inactive position, wherein:
the optical module is mechanically connected to the movable image sensor, the activating actuator is mechanically connected to the movable image sensor and the optical module, and the activating actuator is configured to cause movement of the optical module between an extended position and a retracted position;
the activating actuator is further configured to lift the optical module into the extended position along the optical axis via connection to the optical module when the activating actuator moves the movable image sensor in a plane towards the active position;
in the active position the movable image sensor is stacked under the optical module on the optical axis, and the optical module is in the extended position; and
in the inactive position the movable image sensor is positioned off the optical axis and away from the optical module in an unstacked configuration, and the optical module is in the retracted position within the movement plane.

2. The device of claim 1, wherein the optical module is configured to assume the extended and retracted positions due to a mechanical connection with the movable image sensor, and in the inactive position, a lower end of the optical module is in a same plane as a lower end of the movable image sensor.

3. The device of claim 2, comprising a pin attached to the optical module.

4. The device of claim 3, wherein the activating actuator comprises a connecting arm configured to lift the optical module into the extended position along the optical axis via the pin attached to the optical module when the activating actuator moves the movable image sensor in the plane towards the active position.

5. The device of claim 4, comprising a mechanical lever, wherein the activating actuator is configured to move the movable image sensor and the circuit board in a plane between the active position and the inactive position via the mechanical lever.

6. The device of claim 1, comprising an additional actuator attached to the optical module, wherein the additional actuator is configured to move the optical module along the optical axis.

7. The device of claim 6, comprising a movement controlling element configured to synchronize the activating actuator and the additional actuator such that the movement of the movable image sensor in a plane into the active position is synchronized with the movement of the optical module into the extended position.

8. The device of claim 1, wherein the circuit board is a flexible circuit board connected to the image sensor.

9. The device of claim 8, wherein the flexible circuit board is also connected to the optical module.

10. The device of claim 1, wherein the thickness of the optical module is 3.4 millimeters along the optical axis, and the thickness of the movable image sensor is 0.7 millimeters.

11. The device of claim 1, comprising a pressing mechanism configured to apply a pressing force continuously to the optical module towards the retracted state, wherein the optical module is configured to enter the extended state when a sufficient counteracting force is applied in the direction opposite to the pressing force.

12. The device of claim 1, comprising a movement limiting element configured to retain the optical module either in the extended or the retracted position.

13. The device of claim 1, comprising a casing with an opening, wherein the optical module is configured to move through the opening to assume the extended position, and be concealed in the casing in the retracted position.

14. The device of claim 1, wherein the optical module comprises a top section with a first diameter and a lower section with a second diameter below the top section, wherein the first diameter is smaller than the second diameter.

15. The device of claim 1, comprising a guide rail configured to guide the optical module between the extended position and the retracted position, wherein the movable image sensor is moved away from the optical module as the optical module is moved to the retracted position.

16. The device of claim 1, wherein the optical module comprises an extendible lens barrel.

17. The device of claim 1, wherein the optical module comprises at least one of an image stabilization element and an autofocus element.

18. The device of claim 1, comprising a window attached to the movable image sensor.

19. An imaging device, comprising:
a movable image sensor;
a circuit board connected to the movable image sensor;
an optical module comprising a lens group on an optical axis, the optical module being movable along the optical axis between at least a retracted position and an extended position;
an activating actuator configured to move the movable image sensor and the circuit board in a movement plane between an active position and an inactive position, wherein:
the optical module is mechanically connected to the movable image sensor, the activating actuator is mechanically connected to the movable image sensor and the optical module, and the activating actuator is configured to cause movement of the optical module between an extended position and a retracted position;
the activating actuator is further configured to lift the optical module into the extended position along the optical axis via connection to the optical module when the activating actuator moves the movable image sensor in a plane towards the active position;
in the active position the movable image sensor is stacked under the optical module on the optical axis, and the optical module is in the extended position; and
in the inactive position the movable image sensor is positioned off the optical axis and away from the optical module in an unstacked configuration, and the optical module is in the retracted position within the movement plane; and a space for the movement of the optical module and the movable image sensor, wherein at least part of the space is occupied alternately by the movable image sensor in the active position, and by the retracted optical module in the inactive position, and the movable image sensor and the optical module are positioned in a side by side arrangement in the inactive position.

20. A method for operating an imaging device comprising a movable image sensor configured to move in a plane, a circuit board connected to the image sensor, an optical module comprising a lens group on an optical axis movable along the optical axis between at least a retracted position and an extended position, and an activating actuator attached to the movable image sensor and the circuit board, wherein the optical module is mechanically connected to the movable image sensor, the activating actuator is mechanically connected to the movable image sensor and the optical module, and the activating actuator is configured to cause movement of the optical module between an extended position and a retracted position, the activating actuator is further configured to lift the optical module into the extended position along the optical axis via connection to the optical module when the activating actuator moves the movable image sensor in a plane towards an active position; the method comprising:

receiving an indication that the imaging device has been switched on;

causing the activating actuator to move the movable image sensor into the active position along a movement plane, in which the image sensor is stacked under the optical module on the optical axis, and the optical module is in the extended position;

receiving an indication that the imaging device has been switched off; and causing the activating actuator to move into an inactive position, in which the image sensor is positioned off the optical axis and away from the optical module in an unstacked configuration, and the optical module is in the retracted position within the movement plane.

* * * * *